United States Patent [19]

Stott et al.

[11] 4,322,502

[45] Mar. 30, 1982

[54] SIMULTANEOUS EXPANSION AND CURE OF POLYESTER RESIN COMPOSITION

[75] Inventors: Paul E. Stott, Cheshire; Edward L. Wheeler, Watertown, both of Conn.

[73] Assignee: Uniroyal, Inc., New York, N.Y.

[21] Appl. No.: 186,099

[22] Filed: Sep. 11, 1980

[51] Int. Cl.$^3$ ................................................ C08J 9/10
[52] U.S. Cl. ..................................... 521/99; 521/113; 521/124; 521/128; 521/182
[58] Field of Search ................... 521/124, 128, 182, 99

[56] References Cited

U.S. PATENT DOCUMENTS 3,920,589 11/1975 Jacobs et al. .................... 521/182
3,920,590 11/1975 Jacobs et al. .................... 521/182
3,920,591 11/1975 Jacobs et al. .................... 521/182

*Primary Examiner*—Morton Foelak
*Attorney, Agent, or Firm*—James J. Long

[57] ABSTRACT

Unsaturated polyester resin in solution in ethylenically unsaturated copolymerizable monomer is moved with peroxide catalyst, organometallic promoter and certain hydrazine-type or hydrazone compounds. The liquid mixture expands and cures to provide a solid foamed resin.

27 Claims, No Drawings

SIMULTANEOUS EXPANSION AND CURE OF POLYESTER RESIN COMPOSITION

This invention relates to a method of making a cured and expanded polyester resin composition, and to a curable and cross-linkable composition useful in such method, as well as to cured and expanded product of such method. The invention involves simultaneously expanding and curing liquid unsaturated polyester resin composition by mixing such composition (a) with:

(b) a perioxide;
(c) an organometallic compound capable of promoting decomposition of the peroxide; and
(d) a compound selected from certain hydrazine-type compounds and hydrazones.

There are many references to methods of preparing foamed polyester resin compositions, usually dealing with foaming and crosslinking as separate operations. Either a foam is prepared and then crosslinked without destroying it, or the resin is crosslinked while gas is being released into it. In either of the approaches the gas may be provided by a variety of means. Other methods use certain chemicals acting as curing and foaming agents, but their commercial application has been greatly hindered by serious stability problems, or lack of practicality.

Among the prior patents of interest are U.S. Pat. No. 3,410,719 Nov. 12, 1968 (Roper), which teaches the preparation of non-foamed solid acrylic-type coating compositions employing certain alkyl- or arylhydrazines in combination of either a peroxide or an organic salt. U.S. Pat. No. 3,290,589, Nov. 18, 1975 (Jacobs et al.), discloses a method for expanding unsaturated polyester resin composition using certain sulfonylhydrazides, a peroxide catalyst, a cobalt accelerator and a redox halogen-containing compound. U.S. Pat. No. 3,920,590, Nov. 18, 1975 (Jacobs et al.), deals with the expansion and cure of unsaturated polyesters using chemicals such as 4,4'-oxybis(benzenesulfonyl)hydrazide, hydrazine, together with 5 to 30 times the level of peroxide and metal organic salt normally used for the cure of such polyesters. U.S. Pat. No. 3,920,591, Nov. 18, 1975 (Jacobs et al.), discloses an expansion and cure method for unsaturated polyester resin compositions using a combination of sulfonyl hydrazides, peroxides, cobalt accelerators and amines, and U.S. Pat. No. 3,993,609, Nov. 23, 1976 (Kamens et al.), teaches the use of certain acid sensitive azo compounds such as 2-t-butylazo-2-hydroxybutane, optionally with a curing agent such as a peroxide, and a promoter such as copper naphthenate. Such azo compounds are difficult to handle, require refrigeration and provide very short pot lives.

To date, no chemical compound or mixture reported meets all the necessary criteria of good shelf life, good pot life in the polyester, compatability with standard resin processing equipment and the ability to produce uniform essentially crack-free foams from a wide range of general purpose unsaturated polyester resin compositions.

It has now been found that low density polyester foams having an essentially uniform cell structure can be prepared by mixing (a) a liquid, unsaturated polyester,
(b) a peroxide,
(c) an organometallic compound suitable for promoting decomposition of the perioxide, and
(d) a hydrazine or a hydrazone having a formula selected from

and

wherein R is $C_1-C_{18}$ alkyl, $C_2-C_{18}$ alkenyl, $C_5-C_6$ cycloalkyl, $C_7-C_9$ aralkyl or substituted $C_1-C_{18}$ alkyl, $C_2-C_{18}$ alkenyl, $C_5-C_6$ cycloalkyl, or $C_7-C_9$ aralkyl substituted with halogen, cyano, $C_1-C_4$ alkoxy or $C_1-C_4$ alkoxycarbonyl; $R^1$ and $R^2$ are the same or different and are hydrogen provided that at least one of $R^1$ and $R^2$ is other than hydrogen, $C_1-C_{16}$ alkyl, $C_2-C_{16}$ alkenyl, $C_5-C_6$ cycloalkyl, $C_6-C_{10}$ aryl, $C_7-C_9$ aralkyl, $C_7-C_9$ alkaryl or substituted $C_1-C_{16}$ alkyl, $C_2-C_{16}$, alkenyl, $C_5-C_6$ cycloalkyl, $C_6-C_{10}$ aryl, $C_7-C_9$ aralkyl or $C_7-C_9$ alkaryl substituted with halogen, cyano, $C_1-C_4$ alkoxy, or $C_1-C_4$ alkoxycarbonyl, or $R^1$ and $R^2$ together with the common carbon atom form $C_3$ to $C_8$ cycloalkyl or a bridged ring hydrocarbyl group having 7 to 10 carbon atoms.

Preferred hydrazine compounds of the $RNHNH_2$ type are those in which R is $C_1$ to $C_{12}$ alkyl or $C_5$ to $C_6$ cycloalkyl. Preferred hydrazone compounds of the $RNHN=CR^1R^2$ type are those in which R is $C_1$ to $C_6$ alkyl, and at least one of $R^1$ or $R^2$ is $C_1$ to $C_6$ alkyl, $C_5$ to $C_6$ cycloalkyl or phenyl, or the $=CR^1R^2$ group forms a partially hydrogenated bridged ring aryl moiety having 9 to 10 carbon atoms.

The unsaturated polyester resins employed in the invention may be described as thermosetting polyesterification or condensation products of a polycarboxylic acid with a polyhydric alcohol, at least one of which is ethylenically unsaturated, usually monoethylenically unsaturated. In practice these polyester resins are used in admixture with copolymerizable ethylenically unsaturated monomers, such as styrene, acrylic or methacrylic esters or nitriles, diallylphthalate, triallyl cyanurate, etc. (see, for example, U.S. Pat. Nos. 2,255,313, Ellis, Sept. 9, 1941; 2,667,430, Wells, Jan. 26, 1954; or 3,267,055, Amidon, Aug. 16, 1966, for further details of suitable polyester compositions comprising an unsaturated linear polyester and a copolymerizable ethylenic monomer which is a solvent for the polyester to provide a liquid composition capable of cross-linking to a solid state in the presence of a peroxide catalyst or polymerization initiator). The expression "polyester resin composition" as used herein includes blends of the polyester per se with vinyl monomer. Frequently the unsaturated polyester resin is made from one or more glycols and one or more alpha, beta-ethylenically unsaturated polycarboxylic acids. By way of non-limiting example it may be mentioned that polyester resin can be prepared from such acids or anhydrides, as maleic, fumaric, aconitic, mesaconic, citraconic, ethylmaleic, pyrocinchoninic, veronic or itaconic acid (with or without such acids as adipic, succinic, sebasic, phthalic, linolenic, linoleic, elaeosteric, etc.), with such glycols as ethylene, diethylene, triethylene, polyethylene, 1,3-propylene, 1,2-propylene, dipropylene (1,3 or 1,2), butylene, hexylene or styrene glycol.

The acid number of such polyester resin composition may range from greater than 0 to 150, preferably greater than 0 to 75 and most preferably from 7.5 to 40, expressed in milligrams of KOH per gram of resin composition (i.e., per gram of polyester per se plus vinylic monomer).

A great number of peroxides are useful for carrying out this invention such as hydroperoxides and organic peroxides including hydrogen peroxide. Other non-limiting examples of suitable peroxides are benzoyl peroxide, acetyl peroxide, di-t-butyl peroxide, dicumyl peroxide, methyl ethyl ketone peroxide, di-t-butylperoxy dicarbonate, t-butyl peracetate, t-butyl peroctoate, di-t-butyl diphthalate, t-butyl perbenzoate, 2,5-dimethyl-2,5-bis(benzoylperoxy)hexane, 2,5-dimethyl-2,5-bis(t-butylperoxy)hexane, t-butyl hydroperoxide, cumene hydroperoxide and 2,5-bis(t-butylperoxy)butane. In general any peroxide catalyst or polymerization initiator conventionally used as a curative for unsaturated polyester resin compositions may be employed in the invention, whether organic or inorganic, and whether a true peroxide or an equivalent hydroperoxide. Hydrogen peroxide is particularly suitable, either alone or in combination with an organic peroxide. Reference may be had to the patents cited above for more detailed disclosure of conventional peroxide curatives.

The molar ratio of peroxide (b) to hydrazine or hydrazone (d) may range from 0.08 to 7, usually from 1 to 3.

The promoters or activators employed include a wide range of organometallics and particularly metal salts and soaps which have a beneficial effect in activating or promoting the reaction, and which are known and used in the trade as accelerators or promoters of the peroxide cure of polyesters. Such activators are composed of metal salts and metal soaps typically in their reduced polyvalent states. These compounds are characterized by their preferential reaction with peroxide, and their partial reaction with the free radicals generated from the initial reaction with the peroxide. Typical activators include all metal soaps and salts and complexes therefrom generated by their reaction in polyester resin systems. Such activators would include salts, soaps and complexes of cobaltous, ferrous, vanadous, cadmium, manganous, cuprous, nickelous, stannous, plumbous, zirconium, chromous ions, etc. The anions of such activators may vary and and are often selected to impart solubility to the activators in the polyester system. Typical anions are carboxylates such as $C_2$–$C_{28}$ carboxylates, and include short-chain acids, fatty acids and naphthenates. Such anions include acetate, propionate, butyrate, 2-ethylhexoate, hexoate, octoate, laurate, oleate, linoleate, palmitoate, stearate, acetoacetonates and naphthenics. The preferred activators are the cobalt compounds such as cobalt octoate, cobalt acetoneacetonates and cobalt naphthenics and similar salts, especially salts of cobalt with organic acids. The activators may be used alone or in combination with other activators or metal salts.

Ordinarily, the metal concentration may range from 0.025 to 1.0 part, preferably from 0.040 to 0.4 part, per 100 parts of polyester resin composition (i.e., 100 parts of polyester per se plus monomer) in the case of cobalt. Generally, the concentration may be from 0.40 to 17 mmoles, preferably from 0.70 to 7.0 mmoles of metal per 100 grams of resin composition. If so desired, amine type promoters may be employed as well, such as triethylamine, tributylamine, etc. However, the overall reaction mixture should exhibit a positive acid number.

Hydrazine-type compounds that may be employed for carrying out this invention include alkyl, cycloalkyl and aralkyl hydrazines, however, it is preferred that the hydrazine function not be bonded directly to an aromatic carbon. These hydrazines may also contain other functional groups attached to the alkyl or aryl groups. Hydrazines that are typical of those useful in this invention are: methyl hydrazine, ethyl hydrazine, propyl hydrazine, isopropyl hydrazine, allyl hydrazine, butyl hydrazine, sec-butyl hydrazine, isobutyl hydrazine, pentyl hydrazine, 2-pentyl hydrazine, 3-pentyl hydrazine, isopentyl hydrazine, hexyl hydrazine, 2-hexyl hydrazine, 3-hexyl hydrazine, cyclohexyl hydrazine, heptyl hydrazine, octyl hydrazine, nonyl hydrazine, decyl hydrazine, 2-decyl hydrazine, dodecyl hydrazine, octadecyl hydrazine, 4-(2,6-dimethylheptyl)hydrazine, cyanoethyl hydrazine, benzyl hydrazine, ethyl hydrazinoacetate, hydrazinoacetaldehyde diethyl acetal, 2-phenethyl hydrazine, ethyl 3-hydrazinopropionate.

Hydrazones of the following ketones and aldehydes are useful in this invention: acetone, levulinic acid and its esters, benzoin ethyl ether, 2-butanone, 3-butyne-2-one, dihexyl ketone, 2,6-dimethyl 3-heptanone, 2,6-dimethyl-4-heptanone, 3,5-dimethyl-4-heptanone, 2,4-dimethyl-3-pentanone, 4,4-dimethyl-2-pentanone, 1,1-diphenyl acetone, 1,3-diphenyl acetone, ethyl vinyl ketone, ethyl aceto acetate, 11-heneicoeanone, gamma-heptadecanone, 2-heptanone, 3-heptanone, 4-heptanone, 2-hexanone, 3-hexanone, 5-hexene-2-one, alpha-ionone, beta-ionone, mesityl oxide, methoxy acetone, 6-methyl-5-heptene-2-one, 2-methyl-3-hexanone, 5-methyl-2-hexanone, 4-methyl-2-pentanone, 10-nonadecanone, 2-nonanone, 5-nonanone, 2-octanone, 3-octanone, 8-pentadecanone, 2-pentanone, 3-pentanone, phenoxy acetone, phenyl-2-butanone, pinacolone, 2-undecanone, 6-undecanone, benzophenone, acetophenone, 3,4-dichloroacetophenone, propiophenone, o-methoxy acetophenone, m-methoxy acetophenone, undecanophenone, cyclopropanone, cyclobutanone, cyclopentanone, cyclohexanone, cycloheptanone, cyclohexyl methyl ketone, 1-decalone, 2-decalone, 1-tetralone, 2-tetralone, 1-indanone, 1-indanone, acetaldehyde, benzaldehyde, propionaldehyde, butyraldehyde, decanal, hexanal, pentanal, dodecanal, p-methyl benzaldehyde.

The foregoing lists are meant to be illustrative and should not be considered limiting in any way.

The use of a hydrazone derivative in place of a hydrazine at times may be preferable when the hydrazine is very reactive such as the lower ($C_1$–$C_4$) alkyl hydrazines. The hydrazones seem to provide a slower, more controlled release of gas and radicals resulting in formation of finer celled, more uniform foams. For that purpose, the hydrazone itself may be added or a hydrazine may be introduced together with a suitable amount of a desired ketone in the resin.

The hydrazine-type or hydrazone-type compound (d) is used at a concentration of from 0.1 to 30 mmoles per 100 grams of polyester resin composition (polyester per se plus monomer), providing a wide range of density reduction.

The addition of a suitable surfactant to the reaction mixture is not essential but may be helpful in establishing a more stable foam and a finer, more uniform cell structure. Anionic, cationic or non-ionic surfactants may be employed to aid in nucleation and bubble stabilization. Such surfactants include nonyl phenyl poly(ethylene glycol)ether, nonyl phenoxy poly(ethylenoxy)ethanol, di-tridecyl sodium sulfosuccinate, stearyl dimethylbenzyl ammonium chloride and sodium salt of alkyl aryl polyether sulfonate. Also useful are silicon-type surfactants. Care should be taken that the overall acid number remains positive. Non-ionic surfactants are preferred.

In order to carry out this invention several approaches may be taken. Ordinarily, the promoter and hydrazine or hydrazone are first thoroughly mixed with the polyester resin composition and then the peroxide is added while agitating. Alternatively, one portion of the polyester composition may be blended with the hydrazine or hydrazone and the promoter while to a second polyester portion the peroxide is added; then both portions are combined. Such mixtures may be poured into molds or cast or sprayed, although for spray applications all ingredients may be fed simultaneously to a mixing head immediately prior to spraying. Care should be taken not to precombine peroxide with hydrazine or hydrazone or the promoter. The inclusion of air (oxygen) in the reaction mixture due to too vigorous agitation in the presence of air may inhibit curing or foaming and should therefore be avoided. Thorough blending may be achieved in a closed system or under an inert gas (e.g., nitrogen) blanket.

The expansion and cure of the polyester resin composition is effected simply by exposing the described mixture to expanding and curing conditions. For this purpose ordinary ambient conditions are suitable, since the reaction proceeds spontaneously after the ingredients are mixed. Application of heat is not necessary; the reaction itself is exothermic. If desired, heat may be applied, particularly in a post curing stage.

The foamed polyester prepared according to this invention may be used for making boat hulls, bath tubs, building panels, holding tanks, etc. usually by incorporating, in such polyester, glass fibers for reinforcement.

EXAMPLE 1

A series of experiments was conducted evaluating the effect of promoter concentrations when preparing foamed polyester.

Polyester resin composition (25 g) having an acid number of about 20 and containing about 55 parts of a polymer based on propylene glycol-maleate-phthalate reaction mixture, and about 45 parts (all by weight) of styrene monomer was poured into a 207 cm$^3$ paper cup. To the polyester was added 0.25 g of silicone-glycol copolymer surfactant and various amounts of cobalt naphthenate promoter to achieve the concentrations of cobalt metal indicated in Table 1, as well as 0.175 g of tertiary butylhydrazine. The mixture was stirred for about 15 seconds at room temperature while 0.25 g of 30 percent aqueous hydrogen peroxide was added. The peroxide/hydrazine molar ratio was 1.11. Agitation was continued for another 15 seconds, and then the polyester foam was allowed to develop. The results are summarized in Table I.

TABLE I

| Run No. | 1 | 2 | 3 | 4 | 5 |
|---|---|---|---|---|---|
| Co, grams[1] | 0 | .008 | .025 | .04 | .08 |
| Co, mmoles[1] | 0 | .14 | .42 | .68 | 1.4 |
| Co/PO[3], molar | — | .016 | .048 | .077 | 0.16 |
| Foam, g/cm$^3$[2] | 1.15[4] | .49 | .41 | .44 | .58 |
| Foam structure* | — | A | B | C | C |

| Run No. | 6 | 7 | 8 | 9 | 10 |
|---|---|---|---|---|---|
| Co, grams[1] | .16 | .4 | .65 | 1.0 | 1.2 |
| Co, mmoles[1] | 2.7 | 6.8 | 11. | 17. | 20. |
| Co/PO[3], molar | 0.31 | 0.77 | 1.25 | 1.9 | 2.3 |
| Foam, g/cm$^3$[2] | .66 | .74 | .77 | .74 | [5] |
| Foam structure* | C | C | D | D | — |

Remarks:
[1] Grams per 100 grams of polyester resin composition
[2] Density of foam
[3] Peroxide
[4] Solid
[5] Did not cure
*Foam structure criteria:
A: fine cells, cracked
B: fine cells, slightly cracked
C: fine cells, no cracks
D: coarse cells, no cracks

EXAMPLE 2

Several experiments were undertaken to determine the effects of peroxide and hydrazine concentrations and ratios.

The ingredients and methods of Example 1 were essentially employed except that the polyester had an acid number of 15, and the promoter was cobalt octoate instead of cobalt naphthenate having a Co content of 12 percent by weight. The concentration of the promoter was 0.35 parts and that of the silicone surfactant was one part per 100 parts of polyester (all by weight). The experimental results are found in Table II.

TABLE II

| Run No. | 11 | 12 | 13 | 14 | 15 |
|---|---|---|---|---|---|
| H$_2$O$_2$, g[1] | .22 | .22 | .22 | .33 | .33 |
| TBH[2], g[1] | .025 | .05 | .075 | .10 | .20 |
| H$_2$O$_2$/TBH, molar | 7 | 3.5 | 2.3 | 2.6 | 1.3 |
| Foam, g/cm$^3$[3] | .91 | .85 | .74 | .55 | .35 |

| Run No. | 16 | 17 | 18 | 19 | 20 |
|---|---|---|---|---|---|
| H$_2$O$_2$, g[1] | .44 | .55 | .55 | .66 | .61 |
| TBH[2], g[1] | .20 | .30 | .40 | .50 | .60 |
| H$_2$O$_2$/TBH, molar | 1.7 | 1.4 | 1.1 | 1.0 | 0.8 |
| Foam, g/cm$^3$[3] | .32 | .34 | .24 | .18 | .19 |

All foams prepared exhibited a fine cell structure, and no cracks were observed.

Remarks:
[1] Grams of 30% aqueous H$_2$O$_2$ per 30 grams of resin
[2] Tertiary butylhydrazine
[3] Foam density

EXAMPLE 3

The effect of hydrazone and peroxide concentrations was investigated as well as the ratios of peroxide to hydrazone. In the runs, summarized in Table III, the polyester resin was used as in Example 1 except it contained 0.35 g of cobalt octoate promoter per 100 g of resin. The hydrazone employed was 5-methyl-2-hexanone t-butyl hydrazone. All experiments were essentially conducted as described in Example 1. The results are summarized in Table III.

TABLE III

| Run No. | 21 | 22 | 23 | 24 | 25 | 26 | 27 | 28 |
|---|---|---|---|---|---|---|---|---|
| H$_2$O$_2$,g[1] | .38 | .25 | .38 | .38 | .13 | .25 | .13 | .13 |
| MHTH[2],g[1] | .13 | .13 | .25 | .38 | .13 | .38 | .25 | .38 |
| H$_2$O$_2$/MHTH molar | 4.8 | 3.2 | 2.5 | 1.6 | 1.6 | 1.1 | 0.8 | 0.8 |
| Foam, g/cm$^3$ | .58 | .66 | .48 | .68 | .66 | .53* | .72 | .97* |

Remarks:
[1] Grams per 25 grams of resin
[2] 5-methyl-2-hexanone t-butyl hydrazone All foams had a fine cell structure and no cracks except for foams marked by asterisk (*) which exhibited slight cracking.

EXAMPLE 4

Following essentially the procedure of Example 1, the suitability of various hydrazines for carrying out the invention was investigated. Throughout the experiments 30 g of polyester (see Example 1) was used, containing 0.35 g of cobalt octoate per 100 g of resin, and aqueous hydrogen peroxide (30%) was added (0.33 g) in all runs as well as 0.3 g of silicone surfactant. The results are summarized in Table IV.

TABLE IV

| Run No. | 29 | 30 | 31 | 32 | 33 | 34 | 35 |
|---|---|---|---|---|---|---|---|
| Hydrazine* | MMH | IBH | SPH | DCH | ODH | BZH | CEH |
| Hydrazine, g | .30 | .30 | .20 | .30 | .40 | .30 | .30 |
| Foam, b/cm$^3$ | .27 | .31 | .38 | .51 | .58 | .27 | .26 |
| D. red.**, % | 76 | 73 | 67 | 56 | 50 | 76 | 77 |

Remarks:
*MMH - Monomethylhydrazine
IBH - Isobutylhydrazine
SPH - Sec. pentylhydrazine
DCH - Decylhydrazine
ODH - Octadecylhydrazine
BZH - Benzylhydrazine
CEH - Cyanoethylhydrazine
** - Density Reduction - The results indicate that a wide variety of hydrazines may be used for foaming and curing simultaneously polyester resins A cured solid polyester resin not containing hydrazine had a density of 1.15 g/cm$^3$.

EXAMPLE 5

Several hydrazones were evaluated for their usefulness in carrying out this invention. The polyester resin composition of Example 1 was employed containing 0.35 g of cobalt naphthenate per 100 g of resin, and throughout the runs 0.30 g of aqueous hydrogen peroxide (30%) was used. Table V indicates amounts of hydrazones used per 25 g of resin as well as results.

TABLE 5

| Run No. | 36 | 37 | 38 | 39 | 40 | 41 | 42 |
|---|---|---|---|---|---|---|---|
| Hydrazone* | PMO | BBO | PBO | DBO | HBO | APO | UBO |
| Hydrazone, g | .12 | .19 | .21 | .23 | .25 | .26 | .33 |
| Foam, g/cm$^3$ | .64 | .62 | .59 | .75 | .66 | .70 | .65 |
| D. red.**, % | 44 | 46 | 49 | 35 | 43 | 39 | 43 |

Remarks:
*PMO: 2-Propanone methyl hydrazone
BBO: 2-Butanone t-butyl hydrazone
PBO: 3-Pentanone t-butyl hydrazone
DBO: 3,3-Dimethyl-2-butanone t-butyl hydrazone
HBO: 5-Methyl-2-hexanone t-butyl hydrazone
APO: 2-Undecanone t-butyl hydrazone
UBO: 2-Undecanone t-butyl hydrazone
**D. red: Density reduction All foams exhibited a fine cell structure and no cracks.

EXAMPLE 6

The effect of the addition of ketone to a hydrazine-treated polyester was investigated. For that purpose the ingredients and method of Example 1 were essentially adopted with the exception that to 30 g of polyester, 0.6 g of silicone surfactant, 0.1 g of methylhydrazine (MMH), 0.2 g of cobalt naphthenate as well as 0.12 g of 30 percent aqueous hydrogen peroxide were used. Acetone was added at levels indicated in Table VI wherein the results are also summarized.

TABLE VI

| Run No. | 43 | 44 | 45 | 46 |
|---|---|---|---|---|
| Acetone, g | — | 0.1 | 0.2 | 0.4 |
| MMH/Acetone, molar | — | 1.26 | 0.63 | 0.31 |
| Foam, g/cm$^3$ | .36 | .35 | .30 | .33 |
| Foam structure | (1) | (2) | (3) | (4) |

Remarks:
(1) Moderately fine to coarse cell structure, slightly irregular, no cracks.
(2) As (1) but good uniformity.
(3) Fine and uniform cell structure, no cracks.
(4) Very fine cell structure and excellent uniformity, no cracks.

EXAMPLE 7

The effect of acid number or acidity of the polyester or reaction mixture was investigated using a propylene glycol-maleate-phthalate-based polyester resin (ca 60 percent) plus styrene (ca 40 percent by weight) having an acid number of about 15 and containing 0.35 g of cobalt octoate promoter, 0.25 g of silicone surfactant, 0.25 g 4-methyl-2-pentylhydrazine. The mixtures were catalyzed with 0.4 g of 30 percent aqueous hydrogen peroxide. Prior to the addition of the peroxide the acid numbers in the various runs were adjusted using either acetic acid or triethylamine as noted on Table VII, wherein the results are also summarized.

TABLE VII

| Run No. | 47 | 48 | 49 | 50 | 51 | 52 | 53 | 54 | 55 |
|---|---|---|---|---|---|---|---|---|---|
| TEA$^{(1)}$,g | 0.68 | 0.34 | — | — | — | — | — | — | — |
| HOAC$^{(2)}$,g | — | — | — | 0.27 | 0.67 | 1.07 | 1.6 | 2.27 | 3.6 |
| Acid No. | 0 | 7.5 | 15 | 25 | 40 | 55 | 75 | 100 | 150 |
| Foam, g/cm$^3$ | .89 | .28 | .28 | .28 | .34 | .36 | .37 | .44 | .43 |
| Comments | (*) |  |  |  |  |  | () | () |  |

Remarks:
$^{(1)}$Triethylamine
$^{(2)}$Acetic Acid
(*) Very slow cure
(**) Slow cure, foam settled before full cure Runs 48 through 53 produced cured foams having a fine cell structure and no cracks.

What is claimed is:

1. An expandable and curable polyester composition comprising a mixture of:
   (a) a liquid ethylenically unsaturated polyester resin composition having an acid number from greater than 0 to 150;
   (b) a peroxide;
   (c) an organometallic promoter for the peroxide; and
   (d) a hydrazine or hydrazone compound having the formula:

$$RNHNH_2 \text{ or } RNHN=CR^1R^2$$

wherein R is $C_1$–$C_{18}$ alkyl, $C_2$–$C_{18}$ alkenyl, $C_5$–$C_6$ cycloalkyl, $C_7$–$C_9$ aralkyl or substituted $C_1$–$C_{18}$ alkyl, $C_2$–$C_{18}$ alkenyl, $C_5$–$C_6$ cycloalkyl or $C_7$–$C_9$ aralkyl, the substituent being halogen, cyano, $C_1$–$C_4$ alkoxy or $C_1$–$C_4$ alkoxycarbonyl; $R^1$ and $R^2$ are the same or different and are $C_1$–$C_{16}$ alkyl, $C_2$–$C_{16}$ alkenyl, $C_5$–$C_6$ cycloalkyl, $C_6$–$C_{10}$ aryl, $C_7$–$C_9$ aralkyl, $C_7$–$C_9$ alkaryl or substituted $C_1$–$C_{16}$ alkyl, $C_2$–$C_{16}$ alkenyl, $C_5$–$C_6$ cycloalkyl, $C_6$–$C_{10}$ aryl, $C_7$–$C_9$ aralkyl or $C_7$–$C_9$ alkaryl, the substituent being halogen, cyano, $C_1$–$C_4$ alkoxy or $C_1$–$C_4$ alkoxycarbonyl, or one of $R^1$ or $R^2$ may be hydrogen, and $R^1$ and $R^2$ together with the common carbon atom may form $C_3$ to $C_8$ cycloalkyl or a bridged ring hydrocarbyl group having 7 to 10 carbon atoms.

2. The composition of claim 1 wherein (d) is a hydrazine having the formula $RNHNH_2$.

3. The composition of claim 1 wherein (d) is a hydrazone having the formula $RNHN=CR^1R^2$.

4. The composition of claim 2 wherein R is $C_1$ or $C_{12}$ alkyl, or $C_5$ to $C_6$ cycloalkyl.

5. The composition of claim 3 wherein R is $C_2$ to $C_6$ alkyl; at least one of $R^1$ and $R^2$ is $C_1$ to $C_6$ alkyl, $C_5$ to $C_6$ cycloalkyl or phenyl, or the $=CR^1R^2$ group forms a partially hydrogenated bridged ring aryl moiety having 9 to 10 carbon atoms.

6. The composition of claim 1 wherein the concentration of the organometallic promoter (c) is from 0.40 to 17.0 mmoles of metal, and that of the hydrazine or hydrazone (d) is from 0.1 to 30 mmoles, per 100 grams of polyester resin composition (a).

7. The composition of claim 1 wherein a surfactant is included in said mixture.

8. The composition of claim 2 wherein aldehyde or a ketone is included in said mixture.

9. The composition of claim 1 wherein the molar ratio of peroxide (b) to hydrazine or hydrazone (d) is from 0.08 to 7.0.

10. The composition of claim 1 wherein the acid number of (a) is from greater than 0 to 75.

11. The composition of claim 1 wherein the peroxide (b) is hydrogen peroxide.

12. A method of making an expanded and cured polyester resin composition comprising providing a mixture as in claim 1 and exposing the mixture to expanding and curing conditions.

13. A method of making an expanded and cured polyester resin composition comprising providing a mixture as in claim 2 and exposing the mixture to expanding and curing conditions.

14. A method of making an expanded and cured polyester resin composition comprising providing a mixture as in claim 3 and exposing the mixture to expanding and curing conditions.

15. A method of making an expanded and cured polyester resin composition comprising providing a mixture as in claim 4 and exposing the mixture to expanding and curing conditions.

16. A method of making an expanded and cured polyester resin composition comprising providing a mixture as in claim 5 and exposing the mixture to expanding and curing conditions.

17. A method of making an expanded and cured polyester resin composition comprising providing a mixture as in claim 6 and exposing the mixture to expanding and curing conditions.

18. A method of making an expanded and cured polyester resin composition comprising providing a mixture as in claim 7 and exposing the mixture to expanding and curing conditions.

19. A method of making an expanded and cured polyester resin composition comprising providing a mixture as in claim 8 and exposing the mixture to expanding and curing conditions.

20. A method of making an expanded and cured polyester resin composition comprising providing a mixture as in claim 9 and exposing the mixture to expanding and curing conditions.

21. A method of making an expanded and cured polyester resin composition comprising providing a mixture as in claim 10 and exposing the mixture to expanding and curing conditions.

22. A method of making an expanded and cured polyester resin composition comprising providing a mixture as in claim 11 and exposing the mixture to expanding and curing conditions.

23. The method as in claim 12 in which the resin (a), the organometallic promoter (c) and the hydrazine or hydrazone compound (d) are mixed first, and then the peroxide curative (b) is added.

24. A method for making expanded and cured polyester resin composition comprising preparing a mixture of:
(a) a liquid polyester resin composition comprising an unsaturated linear polyester resin of an alpha, beta-ethylenically unsaturated dicarboxylic acid and a glycol dissolved in an ethylenically unsaturated monomer, having an acid value of from greater than 0 to 75;
(b) a peroxide;
(c) an organometallic promoter for the peroxide; and
(d) a hydrazine or hydrazone compound having the formula $RNHNH_2$ or $RNHN=CR^1R^2$ where R is $C_1-C_{18}$ alkyl, $C_2-C_{18}$ alkenyl, $C_5-C_6$ cycloalkyl, $C_7-C_9$ aralkyl or substituted $C_1-C_{18}$ alkyl, $C_2-C_{18}$ alkenyl, $C_5-C_6$ cycloalkyl or $C_7-C_9$ aralkyl, the substituent being halogen, cyano, $C_1-C_4$ alkoxy or $C_1-C_4$ alkoxycarbonyl; $R^1$ and $R^2$ are the same or different and are $C_1-C_{16}$ alkyl, $C_2-C_{16}$ alkenyl, $C_5-C_6$ cycloalkyl, $C_6-C_{10}$ aryl, $C_7-C_9$ aralkyl, $C_7-C_9$ alkaryl or substituted $C_1-C_{16}$ alkyl, $C_2-C_{16}$ alkenyl, $C_5-C_6$ cycloalkyl, $C_6-C_{10}$ aryl, $C_7-C_9$ aralkyl, $C_7-C_9$ alkaryl, the substituent being halogen, cyano, $C_1-C_4$ alkoxy or $C_1-C_4$ alkoxycarbonyl, or one of $R^1$ or $R^2$ may be hydrogen, and $R^1$ and $R^2$ together with the common carbon atom may form $C_3$ to $C_8$ cycloalkyl or a bridged ring hydrocarbyl group having 7 to 10 carbon atoms, and exposing said mixture to expanding and curing conditions; the concentration of organometallic promoter (c) being from 0.40 to 17 mmoles of metal per 100 grams of resin (a); the concentration of hydrazine-type or hydrazone-type compound (d) being from 0.1 to 30 mmoles per 100 grams of resin (a); and the molar ratio of peroxide (b) to compound (d) being from 0.08 to 7.

25. A method as in claim 24 in which the resin (a) has an acid value of from 7.5 to 40, the concentration of the organometallic promoter (c) is from 0.70 to 7.0 mmoles of metal per 100 grams of resin (a) and the molar ratio of peroxide (b) to hydrazine or hydrazone (d) is from 1 to 3.

26. A method as in claim 25 in which the peroxide curative (b) is hydrogen peroxide and the promoter (c) is a cobalt salt of an organic acid.

27. A method as in claim 25 in which (d) is selected from
t-butylhydrazine
5-methyl-2-hexanone-t-butylhydrazone
monomethylhydrazine
isobutylhydrazine
sec.-pentylhydrazine
decylhydrazine
octadecylhydrazine
benzylhydrazine
cyanoethylhydrazine
2-propanone methyl hydrazone
2-butanone t-butyl hydrazone
3-pentanone t-butyl hydrazone
3,3-dimethyl-2-butanone t-butyl hydrazone
acetophenone t-butyl hydrazone
2-undecanone t-butyl hydrazone
methylhydrazine plus acetone
and 4-methyl-2-pentylhydrazine.

* * * * *